Aug. 5, 1952

J. T. SERDUKE 2,605,619

APPARATUS FOR COOLING GASES

Filed Jan. 20, 1950

WITNESSES:

INVENTOR.
James T. Serduke
BY
Roland A. Anderson
attorney

Patented Aug. 5, 1952

2,605,619

UNITED STATES PATENT OFFICE 2,605,619

APPARATUS FOR COOLING GASES

James T. Serduke, El Cerrito, Calif.

Application January 20, 1950, Serial No. 139,586

4 Claims. (Cl. 62—136)

This invention relates to a method for cooling gases and to a cooling machine and more particularly to a gas cooling machine.

It is well known in the literature that a gas is cooled when it passes into the atmosphere from a reservoir in which it is maintained at a pressure greater than atmospheric. Similarly, if a compressed gas is made to do work, in a machine for example, it is cooled a substantial amount upon being exhausted from the machine. For example, it is known that a compressed gas is cooled if it is made to do work such as reciprocating a piston in a cooling machine or rotating a rotor in a turbine. The principal method of cooling the gas consists essentially of allowing the compressed gas to simultaneously expand and to do internal work in a machine. It is generally preferred in cooling gases according to this method, to load the gas cooling machine either hydraulically, by applying a braking force, or by supplying a working load such as fans or the like, to a crank shaft or to a main shaft of a turbine. The gas cooling machines of the past present a serious problem in that the lubrication of the rotating parts by ordinary methods result in undesirable oil vapor entering the gas lines and contaminating the gas.

The present invention avoids the above difficulties by employing a gas turbine of novel design in which the rotor floats in a gas bearing, thus eliminating the necessity for ordinary lubricants. The gas being cooled is made to do work by directing it in streams against opposingly directed vanes on a rotor of a turbine.

It is therefore an object of this invention to provide a turbine employing gas bearing surfaces, thus avoiding the necessity for ordinary lubrication.

It is another object of this invention to provide a turbine which extracts a maximum amount of work from a compressed gas expanding therethrough.

Other objects and advantages of the present invention will be apparent from the following specification taken in connection with the drawings which are made a part hereof, and also included in the description.

Figure 1:
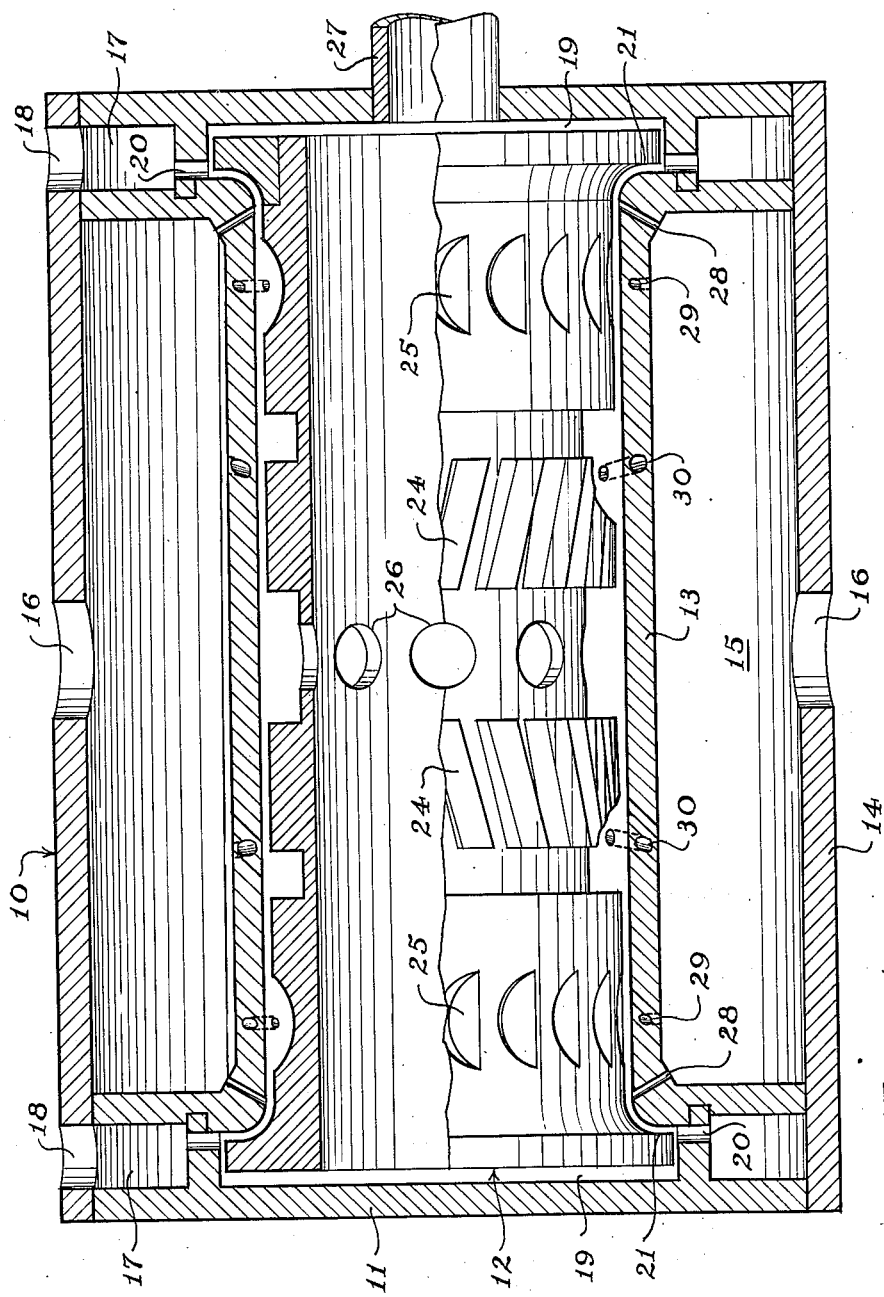
Figure 1 shows a cross-sectional plan view of a gas cooling turbine with the rotor in part in cross-section and in part in elevation.

A gas turbine assembly is indicated generally by the numeral 10 and is shown to comprise a housing 11 and a rotor 12.

The housing includes inner and outer cylinders 13 and 14 respectively. The space between the inner and outer cylinders provides annular gas induction chamber 15 with inlet ports 16 and exhaust chambers 17 and outlet ports 18. The inner cylinder 13 terminates in an annular recessed chamber 19 at each end which communicate with the annular exhaust chamber 17 at either end of the cylindrical housing by means of conduits 20.

A hollow rotor 12 having annular thrust flanges 21 at the ends is housed for rotation in the inner cylinder 13 with annular thrust flanges 21 cooperating with the recessed chamber 19 and when supported centrally with respect thereof is separated therefrom by a small clearance. One of these thrust flanges is detachably secured to the rotor to aid in installation. To support the rotor in operating position, gas is impinged against the surfaces of the thrust flanges and the recessed chambers. Two sets of circumferentially spaced propulsion vanes 24 are mounted diagonally on rotor 12, one on each side of a central diametric plane. These vanes are constructed to exert a force on the rotor when subjected to gas emerging from circumferentially displaced jets. The rotor is provided with two circumferentially spaced sets of arcuate pockets 25 of driving area less than that of the propulsion vanes and positioned on elevated portions adjacent to each end of the rotor. These pockets are for receiving gas emerging from circumferentially displaced jets to exert a force on the rotor in the opposite direction to that exerted by the propulsion vanes. For leading the cooled gas to any desired system the rotor 12 is provided with a plurality of apertures 26 evenly spaced about its periphery which communicate with exhaust conduit 27 located at one of the ends of the housing 11.

Leading from the annular gas chamber 15 through the wall of inner cylinder 13 are gas bearing jets 28, opposing jets 29 and propulsion jets 30. To impress gas in the space between the thrust flanges 21 and the recessed chambers 19 for maintaining the rotor in a state of dynamic balance the gas bearing jets 28 are diverged toward the thrust flanges. To impress gas on arcuate pockets 25, the opposing circumferentially displaced jets 29 are positioned approximately tangentially to a circle passing through the arcuate pockets at about the middle of their depth, and to impress gas on propulsion vanes 24, circumferentially displaced propulsion jets 30 are positioned approximately tangentially to a circle passing through the propulsion vanes at about the middle of their depth.

The operation of the device is as follows: Gas to be cooled is admitted under pressure to annular gas chamber 15 where it is distributed to all jets. To maintain the rotor in a position medial with respect to the stator, gas is forced through gas bearing jets 23 where it impinges on the inner surfaces of each of the thrust flanges.

The gas passing through propulsion jets 30 produces a force on the rotor by impinging against propulsion vanes 24. An opposing force in the opposite direction is produced by gas impinging on arcuate pockets 25 as it is forced through oppositely inclined jets 29. The size of the propulsion jets is selected so that at a certain pressure of the gas in chamber 15, the gas will pass through the jets at the critical velocity. The critical velocity of a gas is that velocity which gives it a maximum cooling effect on passing through a restricted orifice from a high pressure area to a low pressure area.

When the pressure in chamber 15 is adjusted to that pressure which will force the gas through the propulsion jets at critical velocity, the resultant of the forces produced by jets 29 and 30 impinging upon the pockets and vanes 25 and 24 will cause the rotor to rotate at a certain velocity. Once this velocity of rotation is known, the velocity of the rotor can be used to indicate when the pressure of gas in chamber 15 is that which produces the critical velocity in the jets. This is another important feature of the invention as it furnishes a means of gauging the cooling process of the gas so that maximum cooling of the gas is realized. After the gas has been cooled it passes through apertures 26 into exhaust conduit 27 to any desired system. The spent gas from the bearing surfaces is exhausted at reduced pressure through conduits 20 into annular exhaust chambers 17 then through outlet ports 18.

Figure 2:
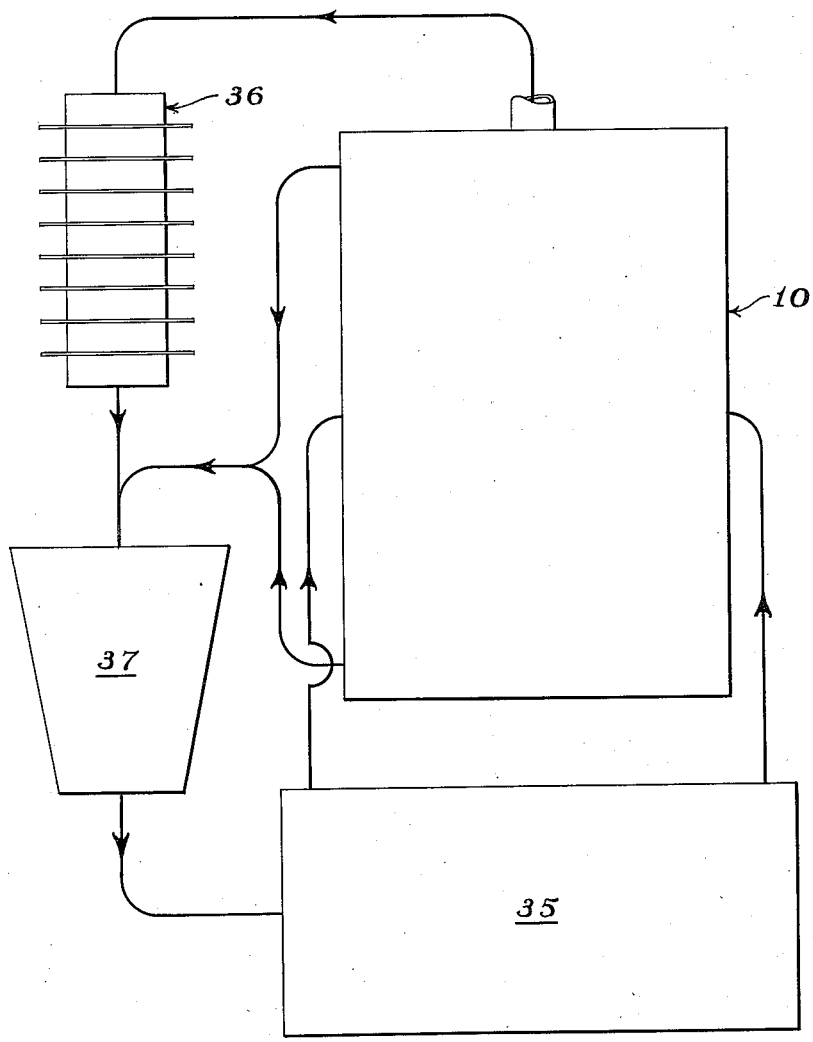
Figure 2 shows a diagrammatic view of the device of this invention in a cooling system.

The operation of the device in a cooling system may be readily followed by reference to the schematic diagram shown in Figure 2 in which gas under pressure in reservoir 35 is delivered to the turbine 10 where it is cooled by expansion and the internal work it does on the rotor. From the turbine 10 it passes to the heat exchanger 36. The heat exchanger gas is drawn to compressor 37 where it is again compressed and delivered to reservoir 35 to complete the cycle. Gas from the exhaust chambers likewise passes into compressor 37 in order to enter the cycle.

The gas cooling machine of this invention is found to be superior for the purpose of the invention. By the use of one model a 200° C. drop in temperature from room temperature is obtained with the input gas at a pressure between 500 and 700 pounds per square inch.

It should be noted that what has been described is an improvement in cooling systems including a gas turbine which effects maximum cooling of a gas by requiring it to travel through a restricted orifice at its critical velocity from a high pressure area to one of lower pressure and to do work by exerting opposing forces on a rotor. A further feature is in the provision of the outwardly extending flange portion of the rotor and the jets directed thereon to form gas separation layers thus permitting the operation of the turbine with the rotor axis vertical, horizontal or at any other desired orientation. In addition, it should be noted that the use of gas separation layers eliminates the necessity for ordinary lubrication.

While various embodiments of the invention have been hereinabove indicated, it will be understood that the invention of this application is not limited to the specific examples herein recited but that numerous modifications and variations thereof may be made without departing from the principles of the invention.

For example, the velocity of the gas passing through the jets may be controlled by making provision for adjusting the size of the jets or by connecting the jets to individual pressure chambers having separate inlet controls.

It will thus be apparent to those skilled in the art that this invention is by no means limited to the particular organization shown and described but that many modifications may be made without departing from the scope of this invention as set forth in the appended claims.

What is claimed is:

1. A gas cooling machine comprising in combination, a stator having an annular gas chamber therein and an annular exhaust chamber in either end, an inner cylinder in said stator having outwardly recessed chambers at either end, a rotor in said inner cylinder having annular thrust flanges cooperating with said recessed chambers and supported in operating position by gas bearing surfaces, opposing sets of driving means mounted on said rotor, sets of circumferentially displaced tangential jets in said inner cylinder aligned with said driving means, sets of circumferentially spaced angular jets in said inner cylinder leading from said gas chamber to the space between said inner cylinder and said annular thrust flanges to provide gas bearing surfaces therebetween, an exhaust conduit for cooled gas leading from said stator, said rotor having apertures in communication with said exhaust conduit, and conduits leading from said recessed chambers to said exhaust chambers.

2. A gas cooling machine comprising a stator, a gas chamber in said stator having inlet ports and exhaust chambers in said stator having outlet ports, an inner cylinder in said stator having recessed chambers at either end, a plurality of sets of circumferentially spaced tangential propulsion jets centrally located in said inner cylinder, a set of circumferentially spaced angular jets in either end of said inner cylinder, a set of circumferentially spaced tangential jets oppositely directed and located between said propulsion and said axial jets, a hollow rotor in said inner cylinder having circumferentially spaced apertures at its center for delivering cooled gases to the interior of said rotor, and annular thrust flanges at either end cooperating with said recessed chambers, a set of propulsion vanes mounted diagonally on each side of center of said rotor, a set of opposing arcuate pockets on a raised portion adjacent the ends of said rotor, an exhaust conduit for cooled gases communicating with the interior of said rotor, said propulsion jets adapted to deliver compressed gas from said gas chamber tangentially on said propulsion vanes for driving said rotor, said opposing jets adapted to deliver compressed gas from said gas chamber to said opposing arcuate pockets to exert a counter-force on said rotor, said angular jets being adapted to deliver compressed gas to the space between said cylinder and thrust flanges to form gas bearing surfaces therebetween, exhaust conduits adapted to deliver gas at reduced pressure from said recessed chambers to said exhaust chambers, said propulsion jets and vanes and opposing jet pockets being so constructed that the resultant of their opposing forces drives the rotor, the speed of the rotor indicating whether the velocity of the gas through the propulsion and opposing jets is the critical velocity for maximum cooling.

3. A gas cooling machine comprising in combination a cylindrical housing, a rotor in said housing, means circumferentially displaced about said rotor for impinging jets of gas against said rotor to support it centrally of said housing, a plurality of sets of oppositely positioned driving means on said rotor, means for simultaneously delivering gas under pressure to said oppositely positioned driving means to exert opposing forces on said rotor, and exhaust means for delivering cooled gas from said machine.

4. A gas cooling machine comprising in combination a cylindrical housing, a rotor in said housing, means circumferentially displaced about said rotor for impinging jets of gas against said rotor to support it centrally of said housing, at least two sets of oppositely directed driving means on said rotor, the driving area of the means in one direction exceeding that in the other direction, means for simultaneously delivering gas under pressure to said oppositely positioned driving means to exert opposing forces on said rotor, and exhaust means for delivering cooled gas from said machine.

JAMES T. SERDUKE.

REFERENCES CITED

The following references are of record in the file of this patent:

UNITED STATES PATENTS

| Number | Name | Date |
| --- | --- | --- |
| 901,385 | Rowan et al. | Oct. 20, 1908 |

FOREIGN PATENTS

| Number | Country | Date |
| --- | --- | --- |
| 724,269 | Germany | Aug. 21, 1942 |